United States Patent
Jung et al.

(10) Patent No.: US 12,299,176 B2
(45) Date of Patent: May 13, 2025

(54) SECURE COMMUNICATION CONTROL SYSTEM AND METHOD USED IN VIRTUALIZED OPERATING SYSTEM ENVIRONMENT

(71) Applicant: Foundation of Soongsil University-Industry Cooperation, Seoul (KR)

(72) Inventors: Souhwan Jung, Seoul (KR); Huy Hoang Nguyen, Seoul (KR); Jungsoo Park, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 235 days.

(21) Appl. No.: 18/020,414

(22) PCT Filed: Nov. 27, 2020

(86) PCT No.: PCT/KR2020/017020
§ 371 (c)(1),
(2) Date: Feb. 8, 2023

(87) PCT Pub. No.: WO2022/034979
PCT Pub. Date: Feb. 17, 2022

(65) Prior Publication Data
US 2024/0037281 A1  Feb. 1, 2024

(30) Foreign Application Priority Data
Aug. 11, 2020 (KR) .................. 10-2020-0100730

(51) Int. Cl.
*G06F 21/62* (2013.01)
*G06F 21/60* (2013.01)
*H04L 9/08* (2006.01)

(52) U.S. Cl.
CPC .......... *G06F 21/629* (2013.01); *G06F 21/602* (2013.01); *H04L 9/0861* (2013.01)

(58) Field of Classification Search
CPC ..... G06F 21/629; G06F 21/602; H04L 9/0861
(Continued)

(56) References Cited

U.S. PATENT DOCUMENTS

| 2017/0339152 | A1* | 11/2017 | Bower, III | ............... H04L 9/14 |
| 2018/0018472 | A1 | 1/2018 | Sturtevant et al. | ..... G06F 21/62 |

(Continued)

FOREIGN PATENT DOCUMENTS

| JP | 2012-178010 A | 9/2012 |
| JP | 6548010 B2 | 7/2019 |

(Continued)

OTHER PUBLICATIONS

International Search Report mailed Apr. 30, 2021, issued to the corresponding International Application No. PCT/KR2020/017020.
(Continued)

*Primary Examiner* — Linglan Edwards
*Assistant Examiner* — Phuc Pham
(74) *Attorney, Agent, or Firm* — Stein IP, LLC (57) ABSTRACT

Provided is a secure communication control system. The secure communication control system comprises a guest control unit provided in a guest operating system for generating a thread requesting arbitrary data from a host application installed in a host operating system; a guest shared key generation unit for generating a guest shared key to be used in the thread; a guest communication unit for transmitting the thread and the guest shared key to the host operating system; a host shared key generation unit for generating a host shared key corresponding to the guest shared key; a host control unit for requesting data according to the thread from the host application to receive the data
(Continued)

from the host application, generating a session key from the guest shared key, and generating cipher text by encrypting the data using the session key; and a host communication unit for transmitting the cipher text and the host shared key to the guest operating system.

11 Claims, 8 Drawing Sheets

(58) Field of Classification Search
USPC .......................................................... 713/171
See application file for complete search history.

(56) References Cited

U.S. PATENT DOCUMENTS

| | | | | |
|---|---|---|---|---|
| 2019/0392117 | A1* | 12/2019 | Viswanathan | ........ G06F 21/121 |
| 2020/0218821 | A1* | 7/2020 | Liu | ..................... H04L 63/0442 |
| 2021/0058229 | A1* | 2/2021 | Jiang | ................... G06F 21/6245 |

FOREIGN PATENT DOCUMENTS

| | | |
|---|---|---|
| KR | 10-2007-0061892 A | 6/2007 |
| KR | 10-1610182 B1 | 4/2016 |
| KR | 10-2019-0062645 A | 6/2019 |

OTHER PUBLICATIONS

Korean Office Action mailed Sep. 28, 2021, issued to the corresponding Korean Application No. 10-2020-0100730.
Advanced Micro Devices, "Secure Encrypted Virtualization API Version 0.24", Apr. 2020.
Le Guan et al, "virtio-ct: A Secure Cryptographic Token Service in Hypervisors" Sep. 2014.

* cited by examiner

SECURE COMMUNICATION CONTROL SYSTEM AND METHOD USED IN VIRTUALIZED OPERATING SYSTEM ENVIRONMENT

CROSS-REFERENCE TO RELATED APPLICATIONS

This application is a national stage of International Application No. PCT/KR2020/017020, filed Nov. 27, 2020, which claims the benefit of Korean Application No. 10-2020-0100730, filed Aug. 11, 2020, in the Korean Intellectual Property Office, the disclosures of which are incorporated herein by reference.

TECHNICAL FIELD

The present invention relates to a secure communication control system and method used in a virtualized operating system environment, and more particularly, to a secure communication control apparatus and method used in a virtualized environment such as a hypervisor.

BACKGROUND ART

Interest in virtualization technology for data transmission between a host operating system and a guest operating system in a high-performance virtualized computing device or I/O is growing. In this regard, the hypervisor (HYP) mode of the ARMx64 architecture may share files or directories through the 9P protocol or share memory based on memory mapping as a method for transmitting data.

However, there is a lack of research and development on techniques that can implement direct and fast data transmission between applications, application programs, or various functions provided in the guest operating system and the host operating system. Accordingly, an efficient data transmission method between the guest operating system and the host operating system is required.

DISCLOSURE

Technical Problem

An object of the present invention is to provide a secure communication control system and method for performing data communication between a host operating system and a guest operating system provided in a virtualized operating system environment.

Technical Solution

One aspect of the present invention comprises a guest control unit provided in a guest operating system for generating a thread requesting arbitrary data from a host application installed in a host operating system: a guest shared key generation unit for generating a guest shared key to be used in the thread; a guest communication unit for transmitting the thread and the guest shared key to the host operating system; a host shared key generation unit for generating a host shared key corresponding to the guest shared key; a host control unit for requesting data according to the thread from the host application to receive the data from the host application, generating a session key from the guest shared key, and generating cipher text by encrypting the data using the session key; and a host communication unit for transmitting the cipher text and the host shared key to the guest operating system.

Further, the guest shared key generation unit, when the thread is generated, sets an arbitrary guest secret key to be used in the thread, and generates the guest shared key using a public key prepared in advance and the guest secret key.

Further, the present invention further comprises a guest control unit for generating the session key by squaring the host shared key with the guest secret key and performing a modular operation using a second public key prepared in advance from a value calculated by squaring the host shared key with the guest secret key.

Further, the host shared key generation unit, when the thread is transmitted to the host operating system, sets an arbitrary host secret key to be used in the thread, and generates the host shared key using a public key prepared in advance and the host secret key.

Further, the host control unit generates the session key by squaring the guest shared key with the host secret key and performing a modular operation using a second public key prepared in advance from a value calculated by squaring the guest shared key with the host secret key.

Further, the host communication unit transmits the cipher text and the host shared key to the guest operating system through VirtIO provided to be connected to the guest operating system.

Further, the guest control unit comprises a guest data control unit for generating, when the cipher text and the host shared key are received from the host operating system, a session key from the host shared key and extracting the data by decrypting the cipher text using the session key.

Further, the guest control unit comprises a guest application control unit for transmitting, when the data is extracted by decrypting the cipher text received from the host operating system, the data to the guest application, and receiving data returned by processing the data in the guest application.

Further, the guest control unit generates a session key from the host shared key and generates cipher text by encrypting the returned data using the session key.

Further, the host control unit, when the cipher text is received from the guest operating system, extracts the returned data by decrypting the cipher text received from the guest operating system using a session key generated from the guest shared key.

Another aspect of the present invention, in a secure communication control method using a secure communication control system used in a virtualized operating system, comprises generating, by a guest operating system, a thread requesting arbitrary data from a host application installed in a host operating system; generating a guest shared key to be used in the thread; transmitting the thread and the guest shared key to the host operating system; generating a host shared key corresponding to the guest shared key; requesting data according to the thread from the host application to receive the data from the host application, generating a session key from the guest shared key, and generating cipher text by encrypting the data using the session key; and transmitting the cipher text and the host shared key to the guest operating system.

Further, generating the guest shared key comprises, when the thread is generated, setting an arbitrary guest secret key to be used in the thread, and generating the guest shared key using a public key prepared in advance and the guest secret key.

Further, the present invention further comprises generating the session key by squaring the host shared key with the guest secret key and performing a modular operation using a second public key prepared in advance from a value calculated by squaring the host shared key with the guest secret key.

Further, generating the host shared key comprises, when the thread is transmitted to the host operating system, setting an arbitrary host secret key to be used in the thread, and generating the host shared key using a public key prepared in advance and the host secret key.

Further, generating the cipher text comprises, generating the session key by squaring the guest shared key with the host secret key and performing a modular operation using a second public key prepared in advance from a value calculated by squaring the guest shared key with the host secret key.

Advantageous Effects

According to one aspect of the present invention described above, by providing a secure communication control system and method used in a virtualized operating system environment, data communication between a host operating system and a guest operating system provided in a virtualized operating system environment can be performed.

BRIEF DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

The detailed description of the present invention which follows refers to the accompanying drawings which illustrate, by way of illustration, specific embodiments in which the present invention may be practiced. These embodiments are described in sufficient detail to enable those skilled in the art to practice the present invention. It should be understood that the various embodiments of the present invention are different from each other but are not necessarily mutually exclusive. For example, specific shapes, structures, and characteristics described herein may be implemented in another embodiment without departing from the spirit and scope of the invention in connection with one embodiment. Additionally, it should be understood that the location or arrangement of individual components within each disclosed embodiment may be changed without departing from the spirit and scope of the invention. Accordingly, the detailed description set forth below is not to be taken in a limiting sense, and the scope of the present invention, if property described, is limited only by the appended claims, along with all equivalents as claimed by those claims. Like reference numbers in the drawings indicate the same or similar function throughout the various aspects.

Hereinafter, preferred embodiments of the present invention will be described in more detail concerning the drawings.

Figure 1:
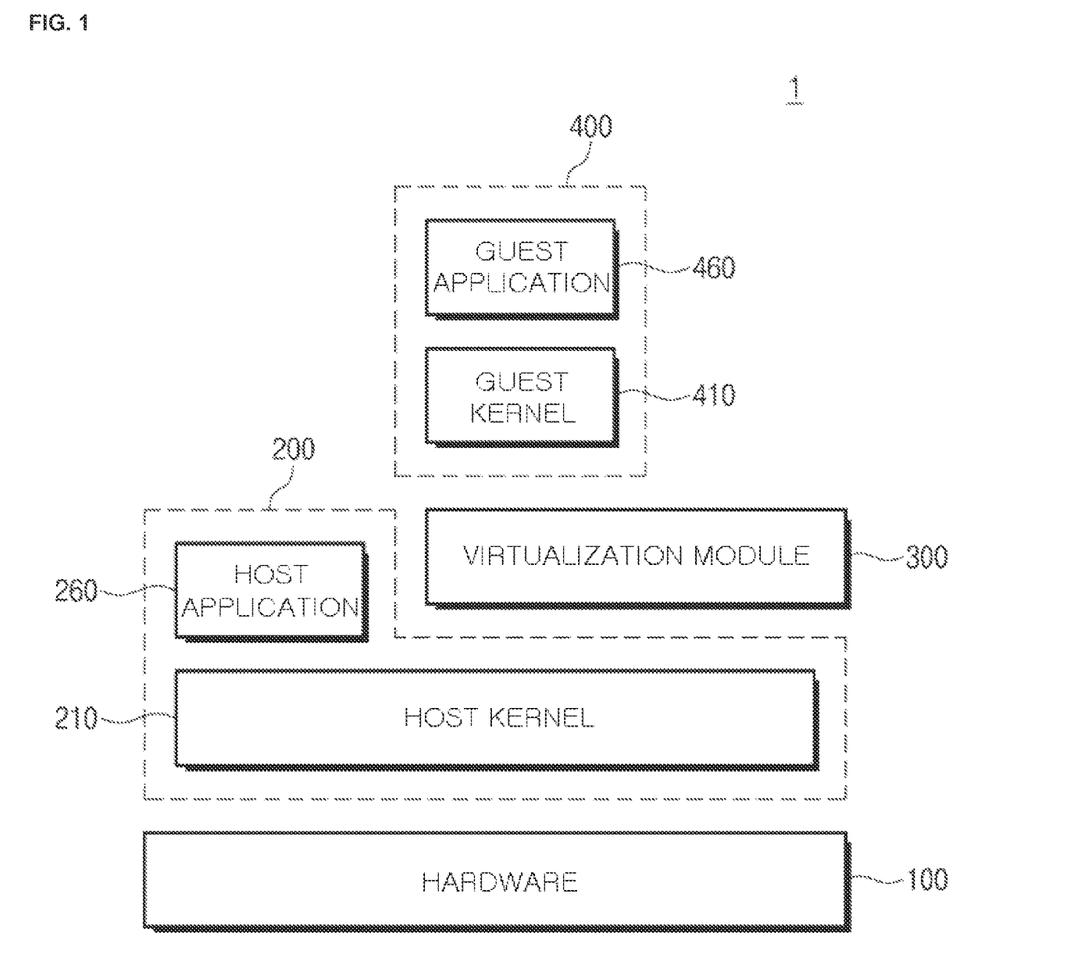
FIG. 1 is a schematic diagram of a secure communication control system according to an embodiment of the present invention.

FIG. 1 is a schematic diagram of a secure communication control system according to an embodiment of the present invention.

The secure communication control system 1 may include hardware 100, a host operating system 200, a virtualization module 300 and a guest operating system 400.

The hardware 100 may refer to a device provided to perform tasks requested by the host operating system 200 and the guest operating system 400. For example, the hardware 100 may include a central processing unit (CPU), a main memory unit including a random access memory (RAM) or a read-only memory (ROM), a graphic processing unit (GPU), and the like, and hardware (100) may further include an auxiliary memory such as a hard disk drive (HDD) and a solid-state drive (SSD), and the hardware 100 may further include an input device such as a keyboard or an output device such as a monitor and a speaker.

In addition, the hardware 100 may further include other devices provided to perform tasks requested by the host operating system 200 and the guest operating system 400, and the hardware 100 further include devices that are required in the implementation of the virtualization module 300.

The host operating system 200 may refer to a set of programs directly installed on the hardware 100 and prepared to easily perform a process of managing resources of the hardware 100 or processing data using the hardware 100. For example, the host operating system 200, Linux or the like may be used.

At this time, the host operating system 200 may include a host application 260 prepared to perform a specific task and a host kernel 210 that controls a task requested by the host application 260 to be performed through the hardware 100.

Here, the host kernel 210 may include a file system provided to access data stored in the hardware 100 or process data stored in the hardware 100 and a driver provided so that hardware 100 can recognize commands called from the host application 260.

Meanwhile, the virtualization module 300 may refer to a virtualization layer installed in the host operating system 200, and the virtualization module 300 may be provided by dividing the hardware 100 into one or more virtual machines (VMs) to use it.

In this case, the virtualization module 300 may be installed in the host operating system 200, and also, the virtualization module 300 may be provided to be directly installed in the hardware 100. The virtualization module 300 may mean a hypervisor such as Kernel-based Virtual Machine (KVM) or QEMU or an emulator.

The guest operating system 400 may refer to a set of programs installed in the host operating system 200 through the virtualization module 300 and prepared to easily perform a process of managing resources of the hardware 100 by the virtualization module 300 or processing data using the hardware 100. For example, the guest operating system 400, Linux, or the like may be used.

At this time, the guest operating system 400 may include a guest application 460 prepared to perform a specific task and a guest kernel 410 that controls tasks requested by the guest application 460 to be performed by the virtualization module 300.

Here, the guest kernel 410 may include a file system provided to access data stored in the hardware 100 through the virtualization module 300 or process data stored in the hardware 100 through the virtualization module 300, or a driver provided so that hardware 100 can recognize commands called from the guest application 460 through the virtualization module 300.

In this regard, the virtualization module 300 may be provided to transmit or receive data between the guest kernel 410 and the host kernel 210 using a driver such as 9p or VirtIO.

Here, a driver such as 9p or VirtIO may be provided to convert a command used in the host operating system 200 or the guest operating system 400 into a command used in another operating system or hardware 100. Through this, the guest application 460 or the host application 260 may be prepared to perform an arbitrary operation in another operating system or hardware 100 using a command provided in each operating system.

Figure 2:
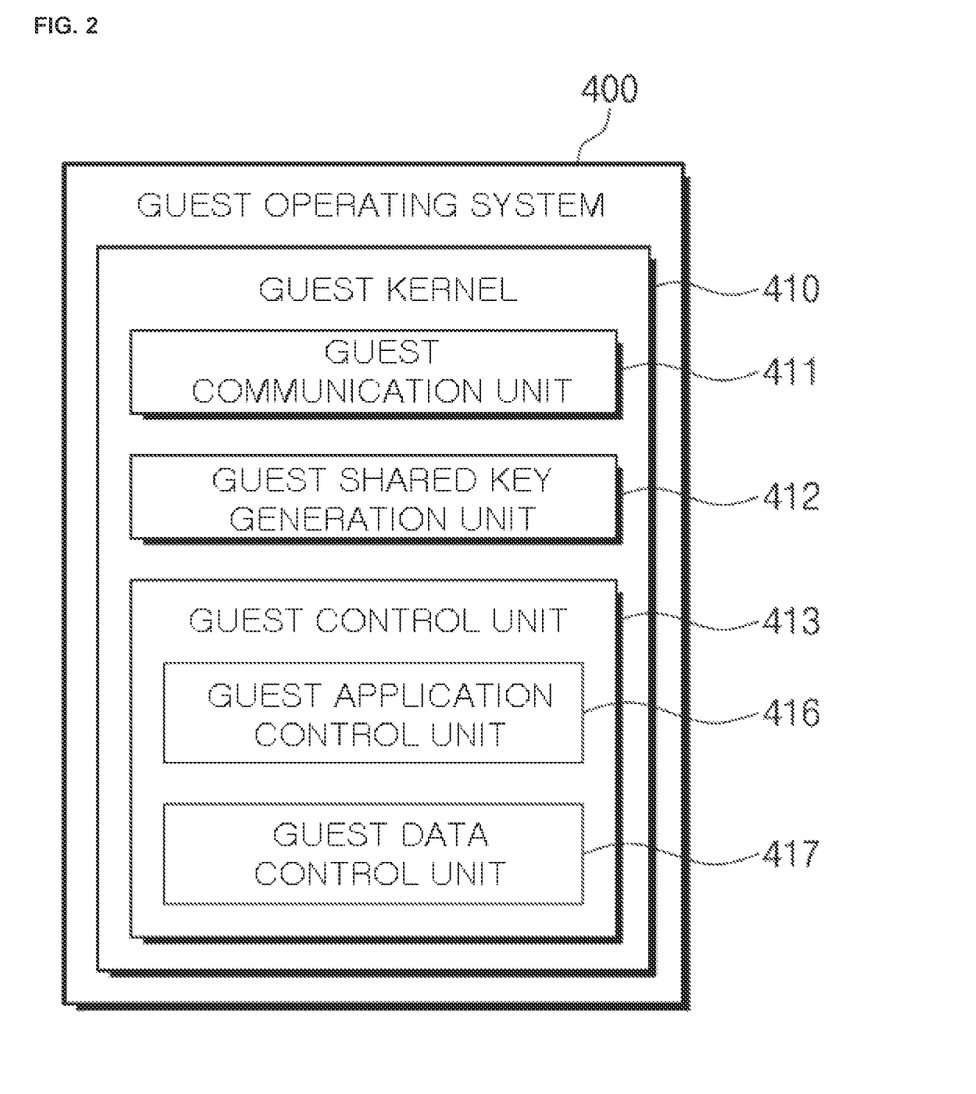
FIG. 2 is a control block diagram of the guest operating system of FIG. 1.

FIG. 2 is a control block diagram of the guest operating system of FIG. 1.

The guest operating system 400 may include a guest kernel 410, and the guest kernel 410 may include a guest communication unit 411, a guest shared key generation unit 412, and a guest control unit 413. The guest control unit 413 may include a guest application control unit 416 and a guest data control unit 417.

The guest application control unit 416 is provided in the guest operating system 400 and may generate a thread requesting arbitrary data from the host application 260 installed in the host operating system 200.

Here, the thread may refer to a series of execution codes prepared to process a process representing a task requested by the guest application 460.

At this time, the thread may be prepared to transmit data prepared in the guest operating system 400 to the host operating system 200 by the guest application 460, and the thread may be prepared to transmit data prepared in the host operating system 200 to the guest operating system 400 by the guest application 460.

In addition, the thread may be provided to transmit data prepared in the guest operating system 400 to the host operating system 200, perform arbitrary data processing by the host application 260, and accordingly transmit returned data from the host operating system 200 to the guest operating system 400. Also, the thread may be provided to transmit data prepared in the host operating system 200 to the guest operating system 400, perform arbitrary data processing by the guest application 460, and accordingly, transmit returned data from the guest operating system 400 to the host operating system 200.

In this way, the thread may be provided to perform arbitrary data processing between the host operating system 200 and the guest operating system 400, and the thread may be provided to process arbitrary data in the host operating system 200 or the guest operating system 400.

Meanwhile, the thread may include a request packet requesting to transmit data to the host operating system 200 or to receive data from the host operating system 200, and such a request packet may be used as a data structure in the form of p9_pdu used in Linux and KVM.

In this case, the host operating system 200 may process data according to the request packet detected through 9p.

When a thread is generated, the guest shared key generation unit 412 may generate a guest shared key to be used in the thread.

In this case, when a thread is generated, the guest shared key generation unit 412 may set an arbitrary guest secret key to be used in the thread, and the guest shared key generation unit 412 may use a public key prepared in advance and the set guest secret key to generate a guest shared key.

Here, the public key prepared in advance may include a first public key used for squaring operation by a guest secret key or a host secret key set in the host operating system 200 and a second public key used for modular operation.

In this case, the modular operation may refer to an operation of calculating a remainder obtained by dividing two numbers as a resultant value.

In addition, the public key may be provided to be used as the same value in the host operating system 200 and an arbitrary guest operating system 400. To this end, when the guest operating system 400 is installed through the virtualization module 300, the host operating system 200 may set the same public key as that of the installed guest operating system 400. At this time, the public key may be updated to a different value according to a preset time interval.

Accordingly, the guest shared key generation unit 412 may generate a guest shared key by squaring the first public key with the guest secret key and performing a modular operation using the second public key from the value calculated by the squaring operation.

Here, the guest shared key generation unit 412 may perform a modular operation such that a remainder of a value obtained by dividing the value calculated by the squaring operation by the second public key is calculated as the resultant guest shared key.

In this way, the guest shared key may be generated using the Diffie-Hellman key exchange technique.

The guest communication unit 411 may transmit the generated thread and guest shared key to the host operating system 200.

At this time, the guest communication unit 411 may transmit the thread and the guest shared key to the host operating system 200 through VirtIO provided to connect the host operating system 200 and the guest operating system 400.

In this regard, transmitting arbitrary data through VirtIO can be understood as writing data to be transmitted to a buffer prepared in VirtIO, and accordingly, receiving the corresponding data can be understood as reading the data written in a buffer prepared in VirtIO.

Meanwhile, the guest communication unit 411 may receive the cipher text encrypted in the host operating system 200 and the host shared key generated in the host operating system 200 from the host operating system 200. Even in this case, the guest communication unit 411 may receive the cipher text and host shared key through VirtIO.

In this case, the guest data control unit 417 may generate a session key by squaring the host shared key with the guest secret key and performing a modular operation using the second public key from the value calculated by the squaring operation.

Here, the guest data control unit 417 may perform a modular operation such that a remainder of a value obtained by dividing the value calculated by the squaring operation by the second public key is calculated as the resultant session key.

In this way, the session key may be generated using the Diffie-Hellman key exchange technique.

Accordingly, the guest data control unit 417 may extract data by decrypting the cipher text received from the host operating system 200 using the session key.

In this case, when data is extracted by decrypting the cipher text received from the host operating system 200, the guest application control unit 416 may transmit the extracted data to the guest application 460 so that the corresponding data is processed by the guest application 460, and the guest application control unit 416 may receive the data returned by processing the data in the guest application 460.

Accordingly, the guest data control unit 417 may generate cipher text by encrypting the returned data using the session key generated from the host shared key, and the guest communication unit 411 may transmit the encrypted cipher text to the host operating system 200.

At this time, the guest communication unit 411 may transmit the cipher text to the host operating system 200 through VirtIO provided to connect the host operating system 200 and the guest operating system 400.

On the other hand, the guest data control unit 417 may stop the thread for the data and delete the thread when the cipher text, in which the data according to the thread is encrypted, is not received from the host operating system 200 within a preset time interval.

In this regard, when a thread is stopped or its execution is completed, the guest shared key generation unit 412 may remove the guest secret key generated for the thread, and accordingly, the guest shared key generation unit 412 may remove the guest shared key generated using the removed guest secret key.

In addition, when a thread is stopped or its execution is completed, the guest data control unit 417 may remove a session key generated for the thread.

Meanwhile, the guest control unit 413 may be provided as a CDR (Custom Data Request) module, and may implement a stable encryption method in data exchange with the host operating system 200 through a Diffie-Hellman key exchange mechanism. Accordingly, the guest control unit 413 can support high-performance data transmission and stably protect data.

Figure 3:
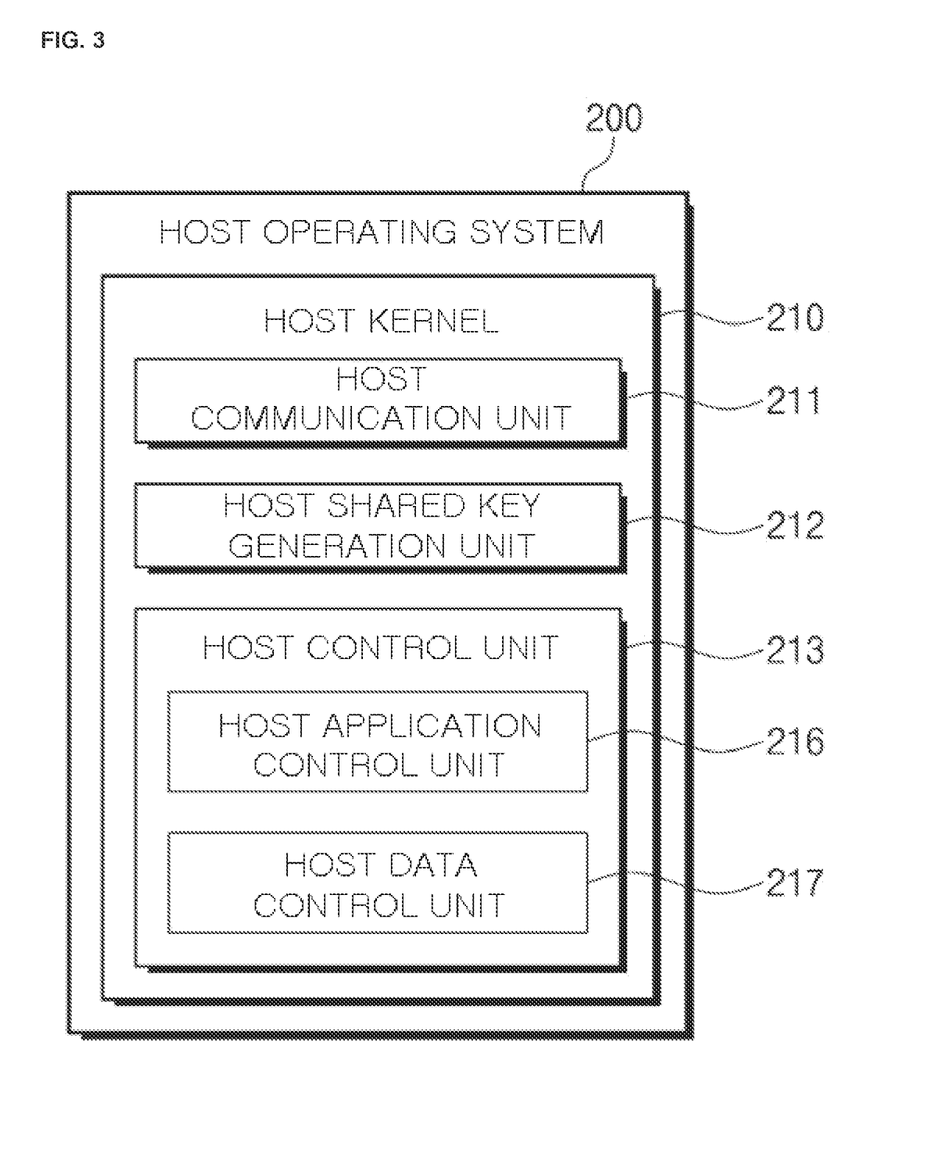
FIG. 3 is a control block diagram of the host operating system of FIG. 1.

FIG. 3 is a control block diagram of the host operating system of FIG. 1.

The host operating system 200 may include a host kernel 210, and the host kernel 210 may include a host communication unit 211, a host shared key generation unit 212, and a host control unit 213. The host control unit 213 may include a host application control unit 216 and a host data control unit 217.

When a thread and a guest shared key is received from the guest operating system 400, the host application control unit 216 may request data according to the thread from the host application 260 to receive the data from the host application 260.

In this case, when data is not received from the host application 260 within a preset time interval, the host application control unit 216 may stop the thread received from the guest operating system 400 and delete the thread.

The host shared key generation unit 212 may generate a host shared key correspond to the guest shared key received from the guest operating system 400. To this end, when the thread generated in the guest operating system 400 is transmitted to the host operating system 200, the host shared key generation unit 212 may set an arbitrary host secret key to be used in the thread, and the host shared key generation unit 212 may use a public key prepared in advance and the host secret key to generate a host shared key.

Accordingly, the host shared key generation unit 212 may generate a host shared key by squaring the first public key with the host secret key and performing a modular operation using the second public key from the value calculated by the squaring operation.

Here, the host shared key generation unit 212 may perform modular operation such that a remainder of a value obtained by dividing the value calculated by the squaring operation by the second public key is calculated as the resultant host shared key.

In this way, the host shared key may be generated using the Diffie-Hellman key exchange technique.

Accordingly, the host data control unit 217 may generate a session key from the guest shared key received from the guest operating system 400, and the host data control unit 217 may generate cipher text by encrypting data using the session key.

At this time, the host data control unit 217 may generate a session key by squaring the guest shared key with the host secret key and performing a modular operation using a second public key prepared in advance from the value calculated by the squaring operation.

Here, the host data control unit 217 may perform a modular operation such that a remainder of a value obtained by dividing the value calculated by the squaring operation by the second public key is calculated as the resultant session key.

In this way, the session key may be generated using the Diffie-Hellman key exchange technique.

The host communication unit 211 may transmit the generated cipher text and host shared key to the guest operating system 400.

At this time, the host communication unit 211 may transmit the cipher text and the host shared key to the guest operating system 400 through VirtIO provided to connect the host operating system 200 and the guest operating system 400.

Meanwhile, the host communication unit 211 may receive the cipher text encrypted in the guest operating system 400 from the guest operating system 400, and even in this case, the host communication unit 211 may receive the cipher text through VirtIO.

In this case, when the cipher text is received from the guest operating system 400, the host data control unit 217 may generate a session key from the guest shared key, and the host data control unit 217 may extract data returned by decrypting the cipher text received from the guest operating system 400 using the session key.

In this case, the guest shared key may be understood as being transmitted when a thread is received, and the session key may be understood as being generated when data is encrypted according to a thread transmitted from the guest operating system 400.

In this case, when the data returned by decrypting the cipher text received from the guest operating system 400 is extracted, the host application control unit 216 may transmit the extracted returned data to the host application 260 so that the host application processes the corresponding data. The host application control unit 216 may receive data returned again by processing the returned data in the host application 260.

In this way, the guest operating system 400 and the host operating system 200 may repeatedly perform data processing operations provided in an arbitrary thread.

Meanwhile, when a thread is stopped or its execution is completed, the host shared key generation unit 212 may remove the host secret key generated for the thread. Accordingly, the host shared key generation unit 212 may remove the host shared key generated using the removed host secret key.

In addition, when a thread is stopped or its execution is completed, the host data control unit 217 may remove a session key generated for the thread.

Meanwhile, the host control unit 213 may be provided as a CDE (Custom Data Extractor) module, and may implement a stable encryption method in data exchange with the guest operating system 400 through a Diffie-Hellman key exchange mechanism. Accordingly, the host control unit 213 can support high-performance data transmission and stably protect data.

Figure 4:
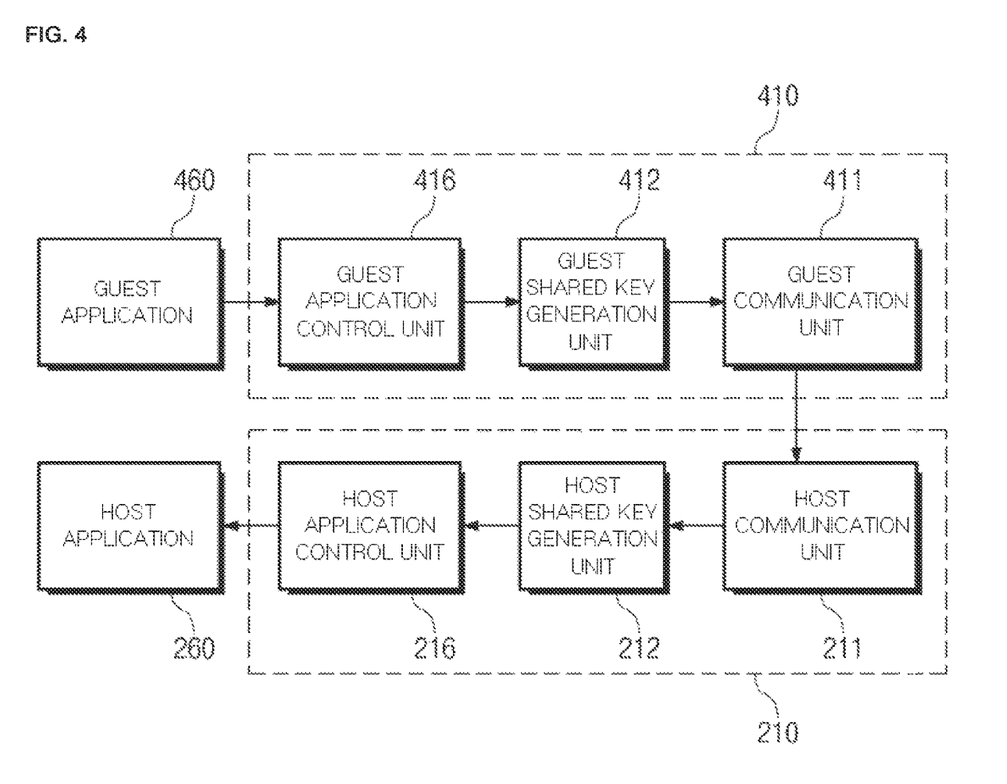
FIG. 4 is a block diagram illustrating a process, in which a thread is generated in the guest application control unit of FIG. 2 and transmitted to the host operating system.

FIG. 4 is a block diagram illustrating a process, in which a thread is generated in the guest application control unit of FIG. 2 and transmitted to the host operating system.

Referring to FIG. 4, the guest application control unit 416 is provided in the guest operating system 400 and may generate a thread requesting arbitrary data from the host application 260 installed in the host operating system 200.

In this case, when a thread is generated, the guest shared key generation unit 412 may generate a guest shared key to be used in the thread.

Here, when a thread is generated, the guest shared key generation unit 412 may set an arbitrary guest secret key to be used in the thread, and the guest shared key generation unit 412 may use a public key prepared in advance and the set guest secret key to generate the guest shared key.

The guest communication unit 411 may transmit the generated thread and guest shared key to the host operating system 200.

At this time, the guest communication unit 411 may transmit the thread and the guest shared key to the host operating system 200 through VirtIO provided to connect the host operating system 200 and the guest operating system 400.

Accordingly, the host communication unit 211 may receive a thread and a guest shared key from the guest operating system 400.

The host shared key generation unit 212 may generate a host shared key corresponding to the guest shared key received from the guest operating system 400. To this end, when the thread generated in the guest operating system is transmitted to the host operating system 200, the host shared key generation unit 212 may set an arbitrary host secret key to be used in the thread, and the host shared key generation unit 212 may use a public key prepared in advance and the host secret key to generate a host shared key.

Accordingly, when the thread and the guest shared key is received from the guest operating system 400, the host application control unit 216 may request data according to the thread from the host application 260 and receive the data from the host application 260.

Figure 5:
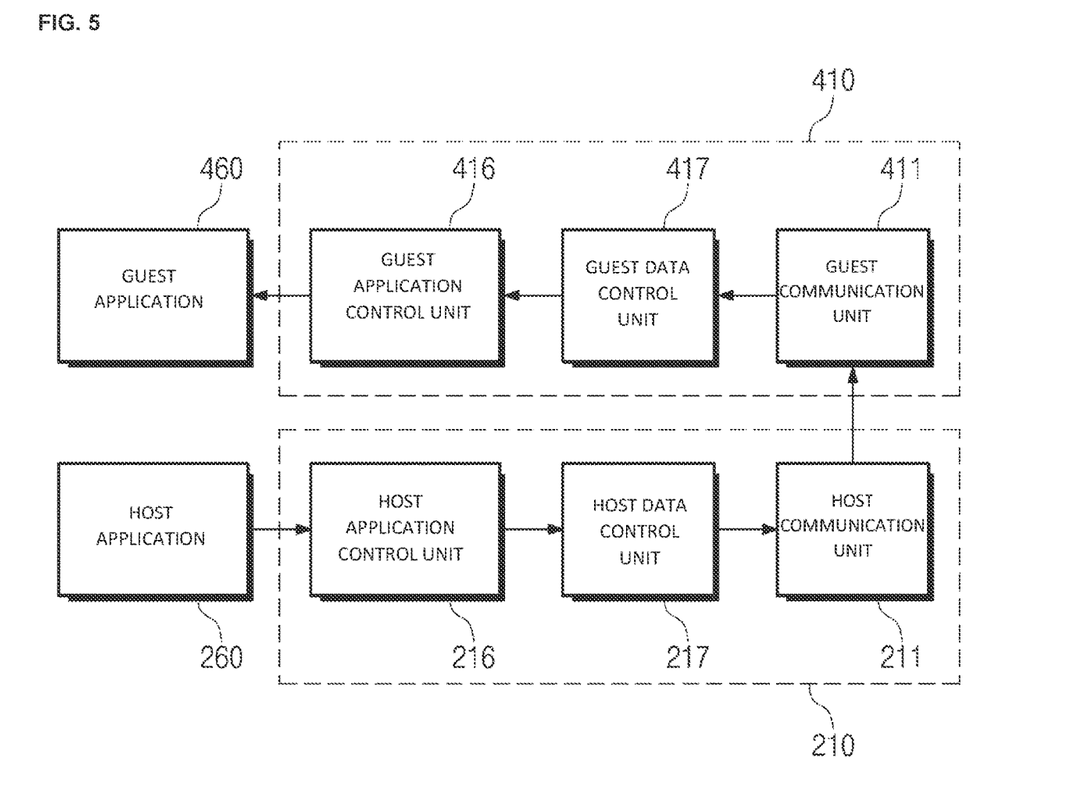
FIG. 5 is a block diagram illustrating a process, in which cipher text is generated in the host data control unit of FIG. 3 and transmitted to a guest operating system.

FIG. 5 is a block diagram illustrating a process in which cipher text is generated in the host data control unit of FIG. 3 and transmitted to a guest operating system.

Referring to FIG. 5, when the thread and the guest shared key are received from the guest operating system 400, the host application control unit 216 may request data according to the thread from the host application 260 and receive the data from the host application 260.

Accordingly, the host data control unit 217 may generate a session key from the guest shared key received from the guest operating system 400, and the host data control unit 217 may generate the cipher text by encrypting the data using the session key.

At this time, the host data control unit 217 may generate the session key by squaring the guest shared key with the host secret key and performing a modular operation using a second public key prepared in advance from the value calculated by the squaring operation.

Here, the host data control unit 217 may perform a modular operation such that a remainder of a value obtained by dividing the value calculated by the squaring operation by the second public key is calculated as the resultant session key.

The host communication unit 211 may transmit the generated cipher text and the host shared key to the guest operating system 400, and the guest communication unit 411 may receive the cipher text and the host shared key from the host operating system 200.

At this time, the host communication unit 211 may transmit the cipher text and the host shared key to the guest operating system 400 through VirtIO provided to connect the host operating system 200 and the guest operating system 400.

Accordingly, the guest data control unit 417 may generate a session key by squaring the host shared key by the guest secret key and performing a modular operation using the second public key from the value calculated by the squaring operation.

Here, the guest data control unit 417 may perform a modular operation such that a remainder of a value obtained by dividing the value calculated by the squaring operation by the second public key is calculated as the resultant session key.

Accordingly, the guest data control unit 417 may extract data by decrypting the cipher text transmitted from the host operating system 200 using the session key.

In this case, when data is extracted by decrypting the cipher text transmitted from the host operating system 200, the guest application control unit 416 may transmit the extracted data to the guest application 460 so that the guest application 460 processes the corresponding data 460, and the guest application control unit 416 may receive the data processed and returned from the guest application 460.

In this regard, the guest data control unit 417 may generate cipher text by encrypting the returned data using a session key generated from the host shared key, and the guest communication unit 411 may transmit the encrypted cipher text to the host operating system 200.

At this time, the guest communication unit 411 may transmit the cipher text to the host operating system 200 through VirtIO provided to connect the host operating system 200 and the guest operating system 400, and the host communication unit 211 may receive the cipher text encrypted in the guest operating system 400 from the guest operation system 400, and even in this case, the host communication unit 211 may receive the cipher text through VirtIO.

In this case, when the cipher text is received from the guest operating system 400, the host data control unit 217 may generate a session key from the guest shared key, and the host data control unit 217 may extract data returned by decrypting the cipher text received from the guest operating system 400 using the session key.

In addition, when the data returned by decrypting the cipher text received from the guest operating system 400 is extracted, the host application control unit 216 may transmit the extracted returned data to the host application 260 so that the host application 260 processes the corresponding data, and the host application control unit 216 may receive data returned again by processing the returned data in the host application 260.

In this way, the guest operating system 400 and the host operating system 200 may repeatedly perform data processing operations provided in an arbitrary thread.

Figure 6:
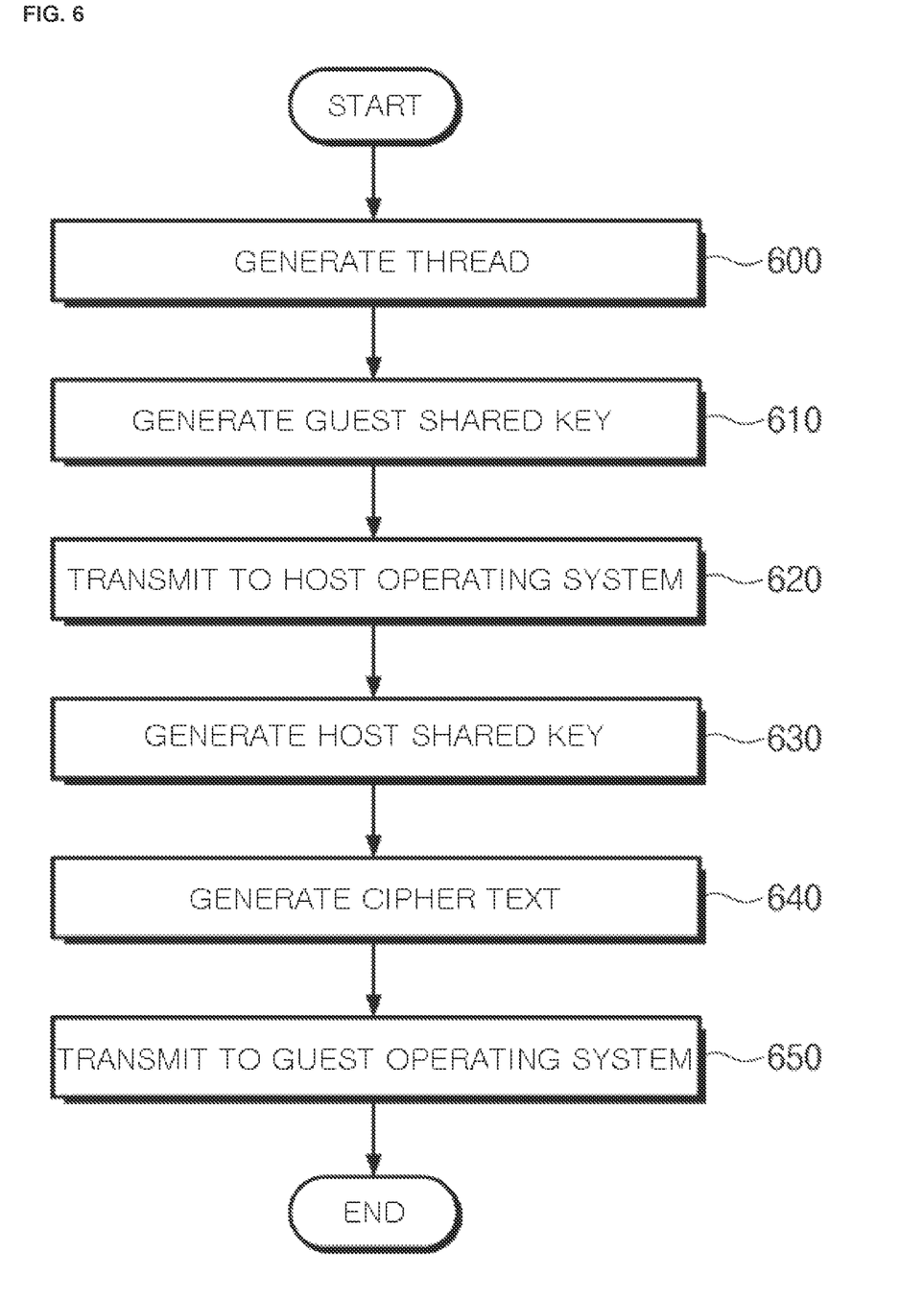
FIG. 6 is a flowchart of a secure communication control method according to an embodiment of the present invention.

FIG. 6 is a flowchart of a secure communication control method according to an embodiment of the present invention.

Since the secure communication control method according to an embodiment of the present invention proceeds on substantially the same configuration as the secure communication control system 1 shown in FIG. 1, the same reference numerals are given to the same components as the secure communication control system 1 shown in FIG. 1, and repeated descriptions will be omitted.

The secure communication control method may comprise Step 600 of generating a thread, Step 610 of generating a guest shared key, Step 620 of transmitting to a host operating system, Step 630 of generating a host shared key, Step 640 of generating cipher text and step 650 of transmitting to the guest operating system.

Step 600 of generating a thread may be a step, in which the guest application control unit 416 generates a thread requesting arbitrary data from the host application 260 installed in the host operating system 200.

Step 610 of generating a guest shared key may be a step, in which the guest shared key generation unit 412 generates the guest shared key to be used in the thread.

Step 620 of transmitting to the host operating system may be a step, in which the guest communication unit 411 transmits the thread and the guest shared key to the host operating system 200.

Step 630 of generating a host shared key may be a step, in which the host shared key generation unit 212 generates the host shared key corresponding to the guest shared key.

Step 640 of generating cipher text may be a step, in which the host application control unit 216 requests data according to the thread from the host application 260, and receives the data from the host application 260, and the host data control unit 217 generates a session key from the guest shared key, and generates cipher text by encrypting data using the session key.

Step 650 of transmitting to the guest operating system may be a step, in which the host communication unit 211 transmits the cipher text and the host shared key to the guest operating system 400.

Figure 7:
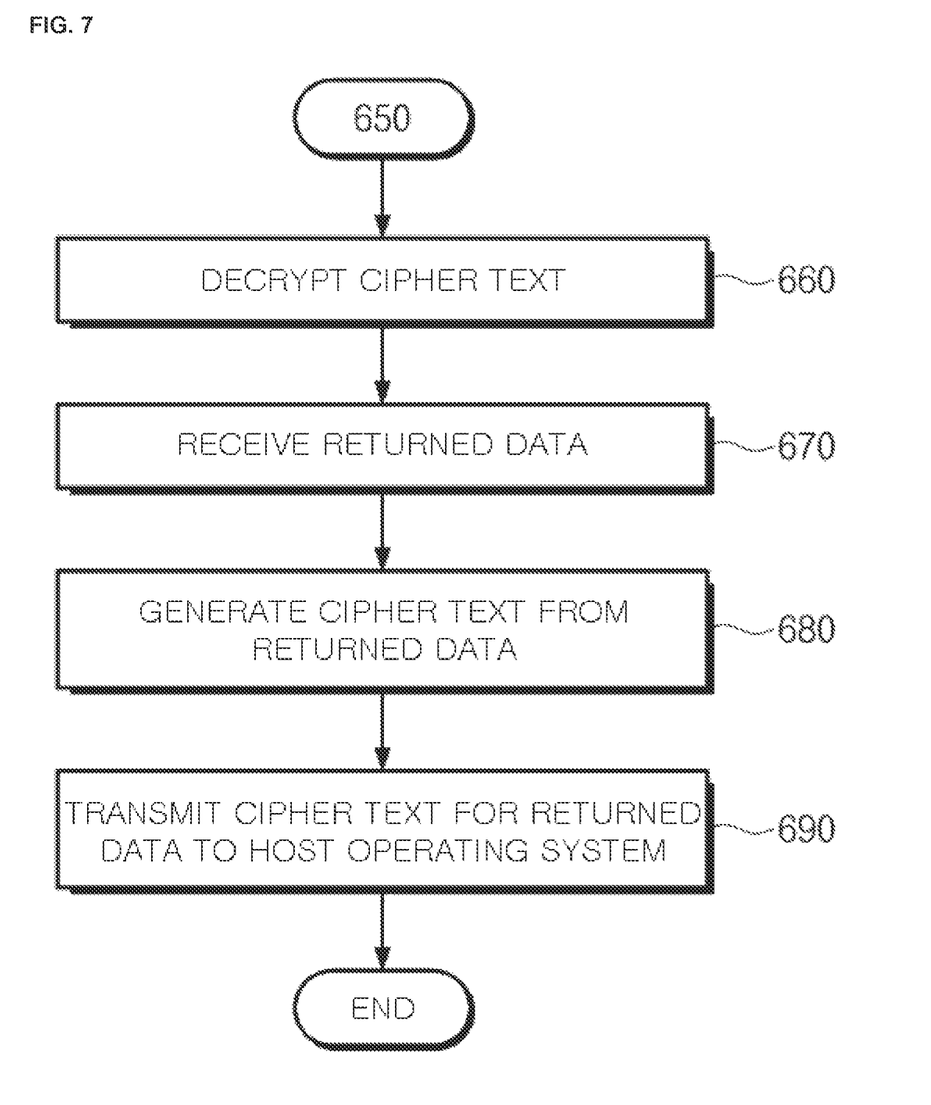
FIG. 7 is a detailed flowchart illustrating a method of transmitting data returned from a guest operating system to a host operating system according to the step of transmitting to the guest operating system of FIG. 6.

FIG. 7 is a detailed flowchart illustrating a method of transmitting data returned from a guest operating system to a host operating system according to Step of transmitting to the guest operating system of FIG. 6.

According to Step 650 of transmitting to the guest operating system, the secure communication control method may further comprise Step 660 of decrypting cipher text, Step 670 of receiving returned data, Step 680 of generating cipher text from the returned data, and Step 690 of transmitting the cipher text for the returned data to the host operating system.

Step 660 of decrypting the cipher text may be a step, in which the guest data control unit 417 extracts data by decrypting the cipher text transmitted from the host operating system 200 using the session key.

Step 670 of receiving the returned data may be a step, in which the guest application control unit 416 transmits the data to the guest application 460, and the guest application control unit 416 receives the data returned by processing the data in the guest application 460.

Step 680 of generating cipher text from the returned data may be a step, in which the guest data control unit 417 generates a session key from the host shared key and generates the cipher text by encrypting the returned data using the session key.

Step 690 of transmitting the cipher text for the returned data to the host operating system may be a step, in which the guest communication unit 411 transmits the cipher text to the host operating system 200.

Accordingly, the secure communication control method may further comprise the step of the host communication unit 211 receiving the cipher text encrypted in the guest operating system 400 from the guest operating system 400. In this case, the secure communication control method may further comprise a step, in which, when the cipher text is received from the guest operating system 400, the host data control unit 217 generates a session key from the guest shared key, and the host data control unit 217 extracts data returned by decrypting the cipher text received from the guest operating system 400 using the session key.

Accordingly, the secure communication control method may further comprise a step, in which, when the host data control unit 217 extracts data returned by decrypting the cipher text received from the guest operating system 400, the host application control unit 216 transmits the extracted returned data to the host application 260 so that the host application processes the corresponding data and the host application control unit 216 receives the data returned again by processing the returned data in the host application 260.

In this way, the secure communication control method may be provided so that the guest operating system 400 and the host operating system 200 repeatedly perform data processing operations provided in an arbitrary thread.

Figure 8:
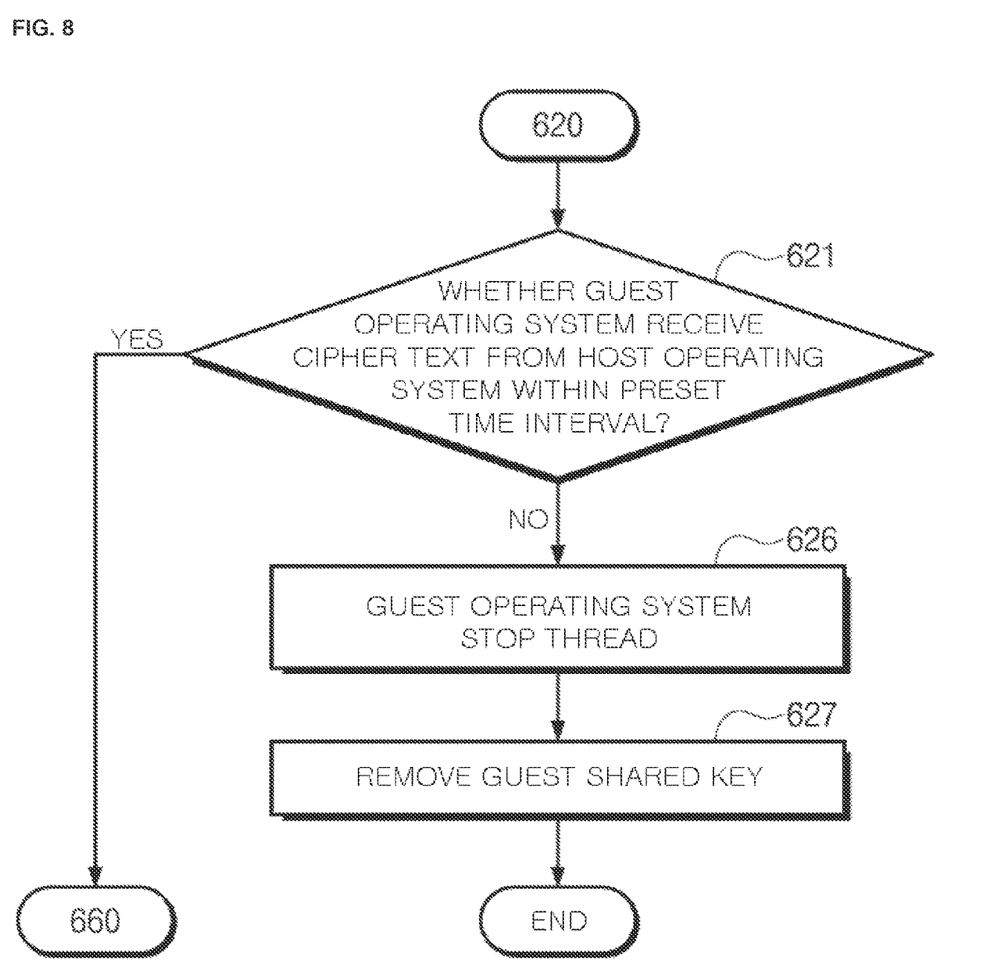
FIG. 8 is a detailed flowchart illustrating a method, in which a guest operating system stops a thread according to the step of transmitting to the host operating system of FIG. 6.

FIG. 8 is a detailed flowchart illustrating a method, in which a guest operating system stops a thread according to the step of transmitting to the host operating system of FIG. 6.

Referring to FIG. 8, in the secure communication control method, the guest data control unit 417 may determine whether cipher text, in which data according to a thread is encrypted, is transmitted from the host operating system 200 within a preset time interval (621).

Accordingly, Step 626 of stopping the thread by the guest operating system may be a step, in which, when the cipher text, in which data according to the thread is encrypted, is not transmitted from the host operating system 200 within a preset time interval, the guest data control unit 417 stops the thread for the data and deletes the thread.

In this regard, Step 627 of removing the guest shared key may be a step, in which, when a thread stops or its execution is completed, the guest shared key generation unit 412 removes the guest secret key generated for the thread, and the guest shared key generation unit 412 removes the guest shared key generated using the removed guest secret key.

In addition, the secure communication control method may further comprise a step, in which, when when a thread is stopped or its execution is completed, the guest data control unit 417 removes a session key generated for the thread.

Although the above has been described with reference to embodiments, it will be understood that those skilled in the art can variously modify and change the present invention without departing from the spirit and scope of the present invention recited in the claims below.

REFERENCE NUMERAL

1: secure communication control system
100: hardware
200: host operating system
300: virtualization module
400: guest operating system

The invention claimed is:

1. A secure communication control system comprising:
a guest control unit provided in a guest operating system for generating a thread requesting arbitrary data from a host application installed in a host operating system;
a guest shared key generation unit for generating a guest shared key to be used in the thread;
a guest communication unit for transmitting the thread and the guest shared key to the host operating system;
a host shared key generation unit for generating a host shared key corresponding to the guest shared key;
a host control unit for requesting data according to the thread from the host application to receive the data from the host application, generating a session key from the guest shared key, and generating cipher text by encrypting the data using the session key; and
a host communication unit for transmitting the cipher text and the host shared key to the guest operating system,
wherein the guest shared key generating unit, when the thread is generated, sets an arbitrary quest secret key to be used in the thread, and generates the quest shared key using a public key prepared in advance and the quest secret key,
the system further comprises a quest control unit for generating the session key by squaring the host shared key with the quest secret key and performing a modular operation using a second public key prepared in advance from a value calculated by squaring the host shared key with the quest secret key.

2. The system of claim 1, wherein the host shared key generation unit, when the thread is transmitted to the host operating system, sets an arbitrary host secret key to be used in the thread, and generates the host shared key using a public key prepared in advance and the host secret key.

3. The system of claim 2, wherein the host control unit generates the session key by squaring the guest shared key with the host secret key and performing a modular operation using a second public key prepared in advance from a value calculated by squaring the guest shared key with the host secret key.

4. The system of claim 1, wherein the host communication unit transmits the cipher text and the host shared key to the guest operating system through VirtIO provided to be connected to the guest operating system.

5. The system of claim 1, wherein the guest control unit comprises a guest data control unit for generating, when the cipher text and the host shared key are received from the host operating system, a session key from the host shared key and extracting the data by decrypting the cipher text using the session key.

6. The system of claim 1, wherein the guest control unit comprises a guest application control unit for transmitting, when the data is extracted by decrypting the cipher text received from the host operating system, the data to a guest application, and receiving data returned by processing the data in the guest application.

7. The system of claim 6, wherein the guest control unit generates a session key from the host shared key and generates cipher text by encrypting the returned data using the session key.

8. The system of claim 7, wherein the host control unit, when the cipher text is received from the guest operating system, extracts the returned data by decrypting the cipher text received from the guest operating system using a session key generated from the guest shared key.

9. A secure communication control method using a secure communication control system used in a virtualized operating system comprising:
generating, by a guest operating system, a thread requesting arbitrary data from a host application installed in a host operating system;
generating a guest shared key to be used in the thread;
transmitting the thread and the guest shared key to the host operating system;
generating a host shared key corresponding to the guest shared key;
requesting data according to the thread from the host application to receive the data from the host application, generating a session key from the guest shared key, and generating cipher text by encrypting the data using the session key; and
transmitting the cipher text and the host shared key to the guest operating system,
wherein generating the quest shared key comprises, when the thread is generated, setting an arbitrary quest secret key to be used in the thread, and generating the quest shared key using a public key prepared in advance and the quest secret key,
the method further comprises generating the session key by squaring the host shared key with the guest secret key and performing a modular operation using a second public key prepared in advance from a value calculated by squaring the host shared key with the guest secret key.

10. The method of claim 9, wherein generating the host shared key comprises,
when the thread is transmitted to the host operating system, setting an arbitrary host secret key to be used in the thread, and generating the host shared key using a public key prepared in advance and the host secret key.

11. The method of claim 10, wherein generating the cipher text comprises,
generating the session key by squaring the guest shared key with the host secret key and performing a modular operation using a second public key prepared in advance from a value calculated by squaring the guest shared key with the host secret key.

* * * * *